US007878491B2

(12) United States Patent
Li et al.

(10) Patent No.: US 7,878,491 B2
(45) Date of Patent: Feb. 1, 2011

(54) CLAMP WITH DRIVING UNIT

(75) Inventors: Hua Li, Shenzhen (CN); Xi-Song Shuai, Shenzhen (CN); Zhen-Chang Tian, Shenzhen (CN); Zhuang Xiong, Shenzhen (CN); Dong Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 417 days.

(21) Appl. No.: 12/177,109

(22) Filed: Jul. 21, 2008

(65) Prior Publication Data

US 2009/0166941 A1 Jul. 2, 2009

(30) Foreign Application Priority Data

Dec. 29, 2007 (CN) ........................ 2007 1 0203564

(51) Int. Cl.
*B23Q 3/00* (2006.01)

(52) U.S. Cl. ............................ 269/20; 269/27; 269/234

(58) Field of Classification Search ................... 269/20, 269/27, 32, 50, 55, 63, 234, 315
See application file for complete search history.

(56) References Cited

U.S. PATENT DOCUMENTS 2,850,926 A * 9/1958 Jobe ........................... 269/234
2,910,110 A * 10/1959 Frohlich ..................... 269/275
4,027,867 A * 6/1977 Pollington ................... 269/94
4,365,792 A * 12/1982 Johns ........................... 269/24
4,515,355 A * 5/1985 Hunter ........................ 269/234
5,595,522 A 1/1997 Simpson et al.
6,373,501 B1 4/2002 Fiero
6,644,089 B1 * 11/2003 Gorgen ....................... 72/452.9
7,210,991 B1 5/2007 Van Der Ve
2009/0179369 A1 * 7/2009 Li et al. ...................... 269/266

FOREIGN PATENT DOCUMENTS

CN 2828743 Y 10/2006
TW 200626255 8/2006
TW M312663 5/2007

* cited by examiner

*Primary Examiner*—George Nguyen
(74) *Attorney, Agent, or Firm*—Zhigang Ma

(57) ABSTRACT

An exemplary clamp includes a holder, a moving unit, a fixing arm, and a driving unit. The moving unit includes a push block, a connecting member, and a guiding member. The guiding member is fixed on the holder. The connecting member connects the push block and the guiding member. The push block includes a slanted side surface. The push block is guided to move by the guiding member. The slanted side surface of the push block interacts with the connecting member. The fixing arm is fixed to the connecting member. The driving unit is connected to the push block. The driving unit is capable of moving the push block of the moving unit.

15 Claims, 5 Drawing Sheets

CLAMP WITH DRIVING UNIT

BACKGROUND

1. Field of the Invention

The present invention generally relates to device manufacture, and, more specifically, to a clamp fixing a workpiece during a manufacturing process.

2. Discussion of the Related Art

Conventionally, to enhance mechanical strength and appearance of an electronic device, a metallic cover is provided. An outer surface of the metallic cover is conventionally a polished surface.

Generally, before polishing a workpiece such as a cover, the workpiece needs to be positioned securely. Typically, if the outer surface of the workpiece includes a curved portion and a planar portion, the workpiece is mainly positioned by manually fixing the workpiece, a process consuming considerable time. In addition, due to the curved and planar profiles of the workpiece, the outer surface cannot be completely polished in one process. Repositioning of a typical workpiece is required at least twice, thereby consuming even more time.

What is needed, therefore, is a clamp that can overcome the shortcomings described.

SUMMARY

A clamp includes a holder, a moving unit, a fixing arm, and a driving unit. The moving unit includes a push block, a connecting member, and a guiding member. The guiding member is fixed on the holder. The connecting member connects the push block and the guiding member. The push block includes a slanted side surface. The push block is guided by the guiding member. The slanted side surface of the push block interacts with the connecting member. The fixing arm is fixed to the connecting member. The driving unit is connected to the push block. The driving unit moves the push block of the moving unit.

Other novel features and advantages will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present clamp. Moreover, in the drawings, like reference numerals designate corresponding parts throughout several views, and all the views are schematic.

DETAILED DESCRIPTION OF THE EMBODIMENTS

Reference will now be made to the drawings to describe exemplary embodiments of the present clamp in detail.

Figure 1:
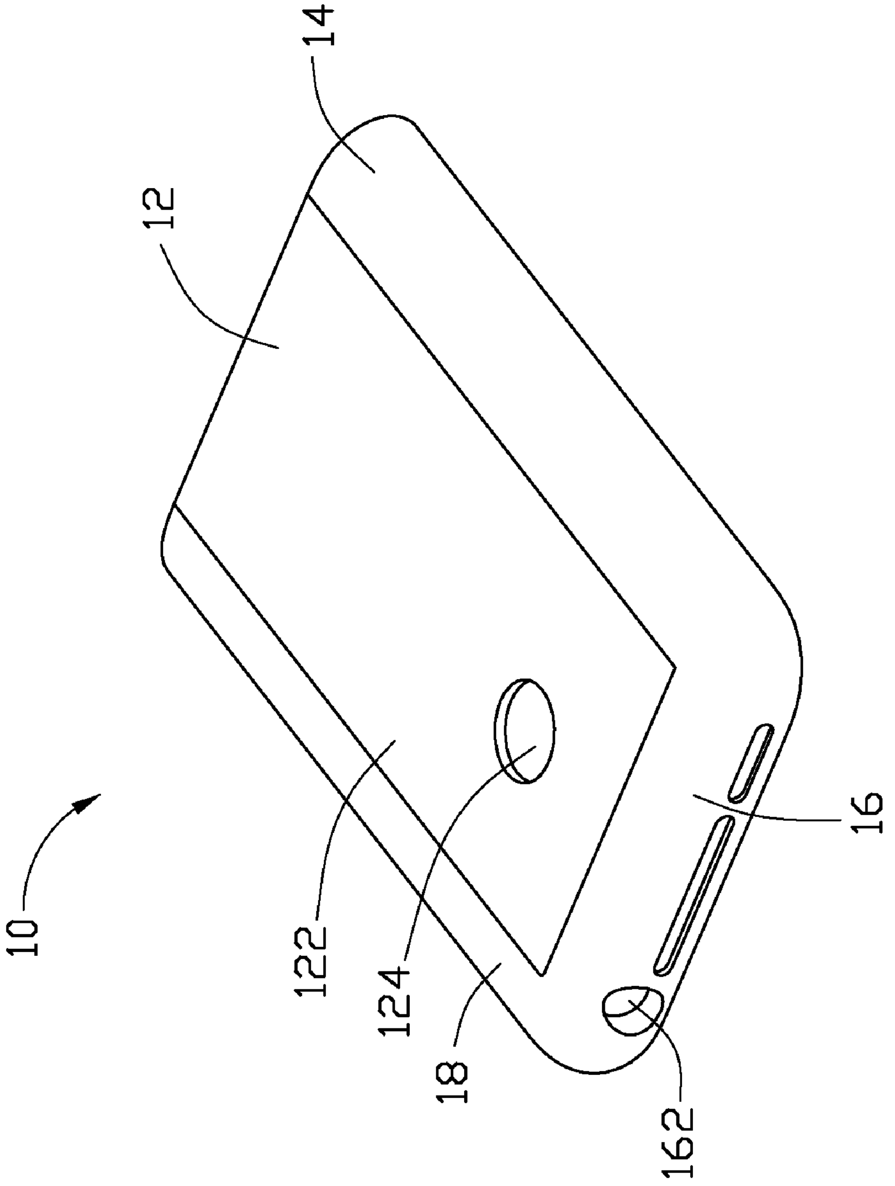
FIG. 1 is an isometric view of an exemplary workpiece that eventually becomes a cover of an electronic device.

Referring to FIG. 1, an exemplary workpiece 10 is shown. The workpiece 10 eventually becomes a cover of an electronic device, includes a bottom board 12, a first sidewall 14, a second sidewall 16, and a third sidewall 18. The bottom board 12 includes a planar surface 122 and a first through hole 124 defined in the planar surface 122. The first sidewall 14, the second sidewall 16, and the third sidewall 18 extend from ends of the bottom board 12 correspondingly. The second sidewall 16 connects with the first sidewall 14 and the third sidewall 18. The first side wall 14 faces the third sidewall 18. The first sidewall 14, the second sidewall 16, and the third sidewall 18 are all curved. In addition, the second sidewall 16 defines a second through hole 162.

Figure 2:
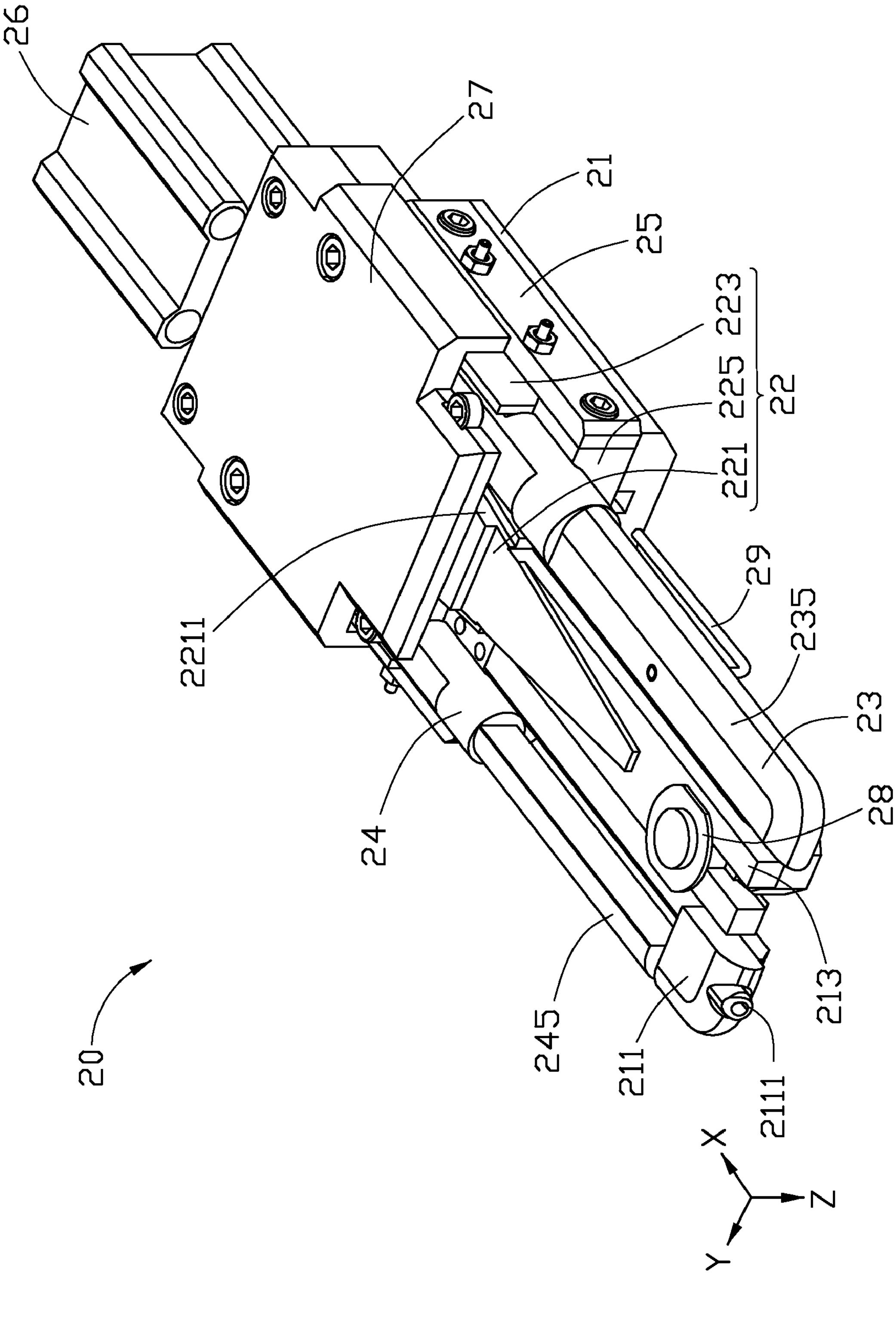
FIG. 2 is an enlarged, assembled view of a clamp in accordance with an exemplary embodiment of the present invention.

Referring to FIG. 2, a clamp 20 according to an exemplary embodiment can be mounted on a machine for positioning the workpiece 10 for an exemplary purpose, such as polishing an outer surface thereof. The clamp 20 includes a holder 21, a moving unit 22, a first fixing arm 23, a second fixing arm 24, two restricting members 25, a driving unit 26, a cover 27, and a protecting member 28.

Figure 3:
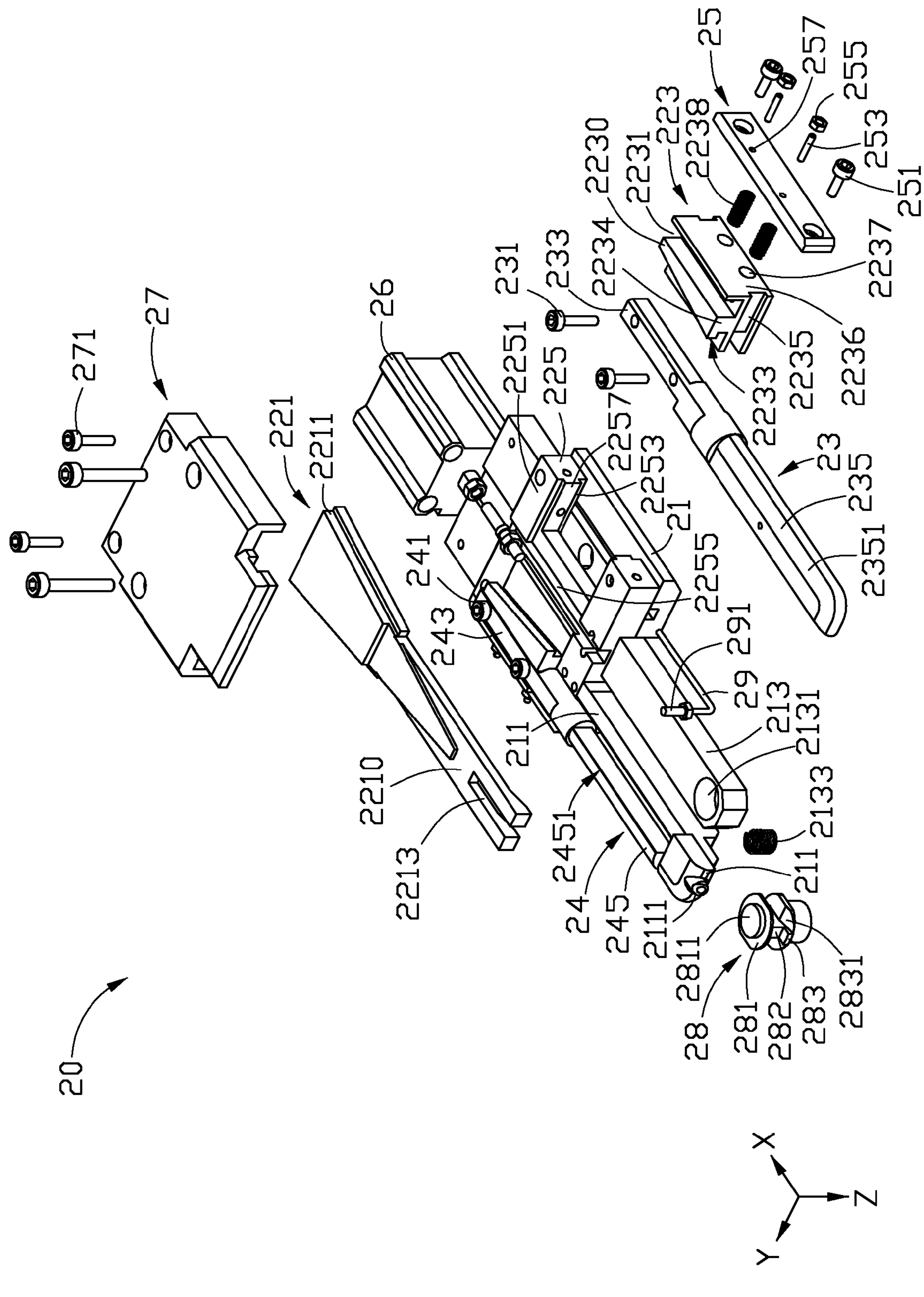
FIG. 3 is a partly exploded view of the clamp of FIG. 2.

Referring also to FIG. 3, the holder 21 includes a first mating arm 211 and a second mating arm 213 on an end thereof. The first mating arm 211 is substantially parallel to the second mating arm 213. The first mating arm 211 has a protrusion 2111. The shape of the protrusion 2111 corresponds to a joint in the inner surfaces of the second sidewall 16 and the third sidewall 18. The second mating arm 213 defines a blind hole 2131 in a distal end thereof. In addition, a spring 2133 is configured in the blind hole 2131.

The moving unit 22 includes a push block 221, two connecting members 223, and a guiding member 225.

Figure 4:
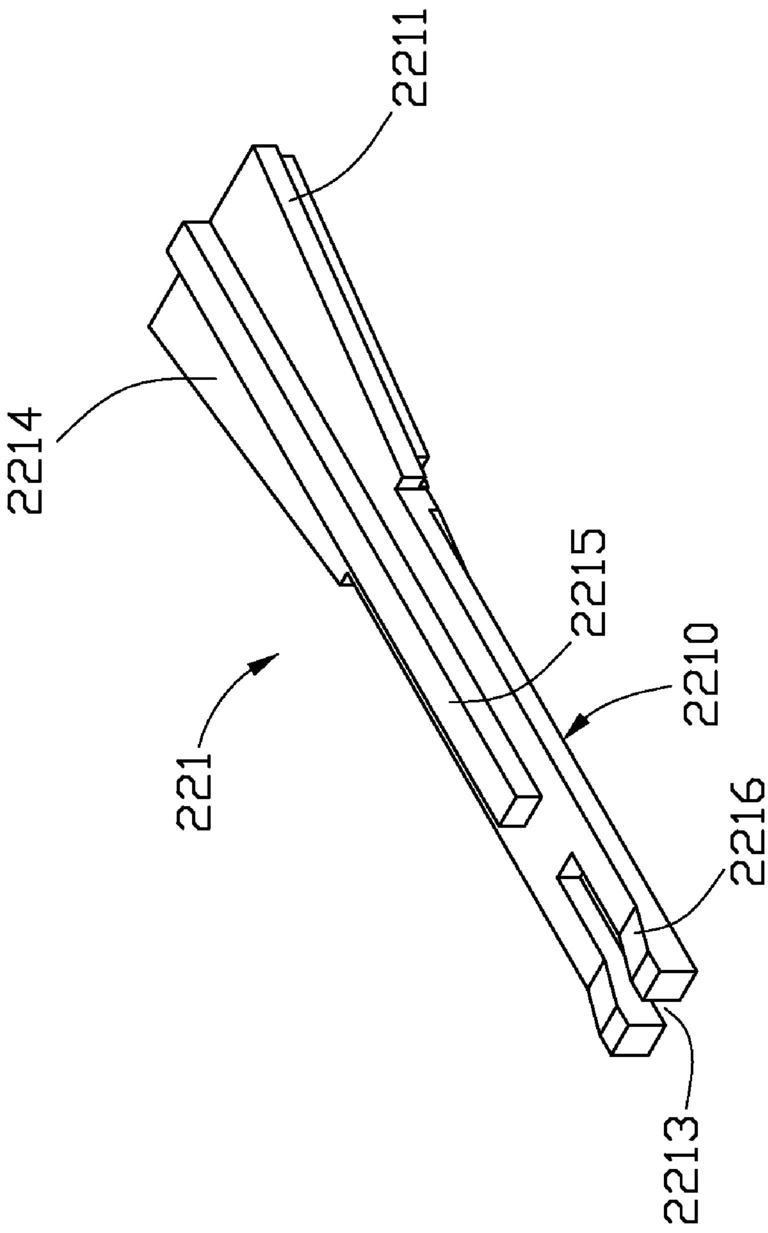
FIG. 4 is an isometric view of a push block of the clamp of FIG. 2.

Referring also to FIG. 4, the push block 221 is connected to the driving unit 26. The push block 221 is symmetrical. The push block 221 includes an upper surface 2210, two slanted side surfaces 2211, a clamping groove 2213, a lower surface 2214, and a sliding protrusion 2215. The upper surface 2210 and the lower surface 2214 are on two opposite sides of the push block 221. The slanted side surfaces 2211 connect with the upper surface 2210 and the lower surface 2214. The sliding protrusion 2215 is an elongated protrusion located at the lower surface 2214 along an axis of the push block 221. A cross section of the sliding protrusion 2215 taken along a direction perpendicular to the axis of the push block 221 is rectangular. A distance between the slanted side surfaces 2211 decreases with increasing distance from the driving unit 26. The lower surface 2214 has a slanted portion 2216 on an end opposite to the driving unit 26. The clamping groove 2213 communicates between the upper surface 2210 and the slanted portion 2216 of the lower surface 2214.

Each of the connecting members 223 includes a top surface 2230, a mating surface 2233, two connecting side surfaces 2234, and an outer side surface 2236. The mating surface 2233 and the outer side surface 2236 are on opposite sides of the connecting members 223. The connecting side surfaces 2234 connect the mating surface 2233 and the outer side surface 2236. The top surface 2230 defines a fixing groove 2231. Each of the connecting side surfaces 2234 defines a mating groove 2235. The outer side surface 2236 defines two blind holes 2237. In addition, two springs 2238 are configured in the blind holes 2237 correspondingly.

The guiding member 225 located on the holder 21 is substantially "H"-shaped. The guiding member 225 may guide the push block 221 and the connecting members 223 to move. The guiding member 225 includes a top surface 2251, an inner side surface 2253 connecting with the top surface 2251, an elongated guiding groove 2255 defined in the top surface 2251, and two guiding protrusions 2257 formed on the inner side surface 2253. A cross section of the guiding groove 2255 taken along a direction perpendicular to an axis of the guiding member 225 is rectangular and corresponds to the shape of sliding protrusion 2215.

When the moving unit 22 is assembled, the push block 221 is located on the guiding member 225, and the sliding protrusion 2215 is engaged in the guiding groove 2255. The slanted side surfaces 2211 of the push block 221 contact the mating surfaces 2233 of the connecting members 223 correspondingly. The guiding protrusions 2257 of the guiding member 225 are engaged in the mating grooves 2235 of the connecting members 223.

The first fixing arm 23 and the second fixing arm 24 are correspondingly fixed to the connecting members 223 of the moving unit 22 by screws 231, 241. The first fixing arm 23 and the second fixing arm 24 each include fixing portions 233, 243, and clamping portions 235, 245. The fixing portions 233, 243 are engaged in the fixing grooves 2231 of the connecting members 223 of the moving unit 22 correspondingly. A shape of the clamping portion 235 of the first fixing arm 23 corresponds to the inner surfaces of the first sidewall 14 and the second sidewall 16 of the workpiece 10. A shape of the clamping portion 245 of the second fixing arm 24 corresponds to the inner surface of the third sidewall 18 of the workpiece 10.

Each of the restricting members 25 is substantially a planar sheet. The restricting members 25 are fixed to the guiding member 225 of the moving unit 22 by fasteners such as screws 251. The side surface of each restricting member 25 adjacent to the connecting member 223 is resisted by the springs 2238 in the blind holes 2237 of the connecting member 223. Each of the restricting members 25 includes a restricting pin 253 restricting the movement of the connecting member 223. Each of the restricting pins 253 is fixed to the restricting members 25 by means of a nut 255 and a fixed hole 257.

The driving unit 26 moves the push block 221. In this embodiment, the driving unit 26 is an air cylinder. In an alternative embodiment, the driving unit 26 may be a motor.

The protecting member 28 is substantially columnar, and includes a first resisting portion 281, a connecting portion 282, and a second resisting portion 283. The connecting portion 282 is located between the first resisting portion 281 and the second resisting portion 283. The connecting portion 282 is engaged in the clamping groove 2213 of the push block 221. The first resisting portion 281 has a columnar protrusion 2811 protruding from a top surface of the first resisting portion 281. A diameter of the columnar protrusion 2811 is less than a diameter of the first through hole 124 of the workpiece 10. The second resisting portion 283 has a slanted surface 2831. A shape of the mating slanted surface 2831 corresponds to the slanted portion 2216 of the push block 221.

In use, the moving unit 22 is fixed to the holder 21. The push block 221 of the moving unit 22 is connected to the driving unit 26. The first fixing arm 23 and the second fixing arm 24 are fixed to the connecting members 223 of the moving unit 22. The cover 27 is positioned on the moving unit 22, and fixed to the holder 21 and the guiding member 225 of the moving unit 22 by fasteners such as screws 271. The protecting member 28 is clamped in the clamping groove 2213 of the push block 221, and resisted by the spring 2133 in the blind hole 2131 of the second mating arm 213 of the holder 21.

Figure 5:
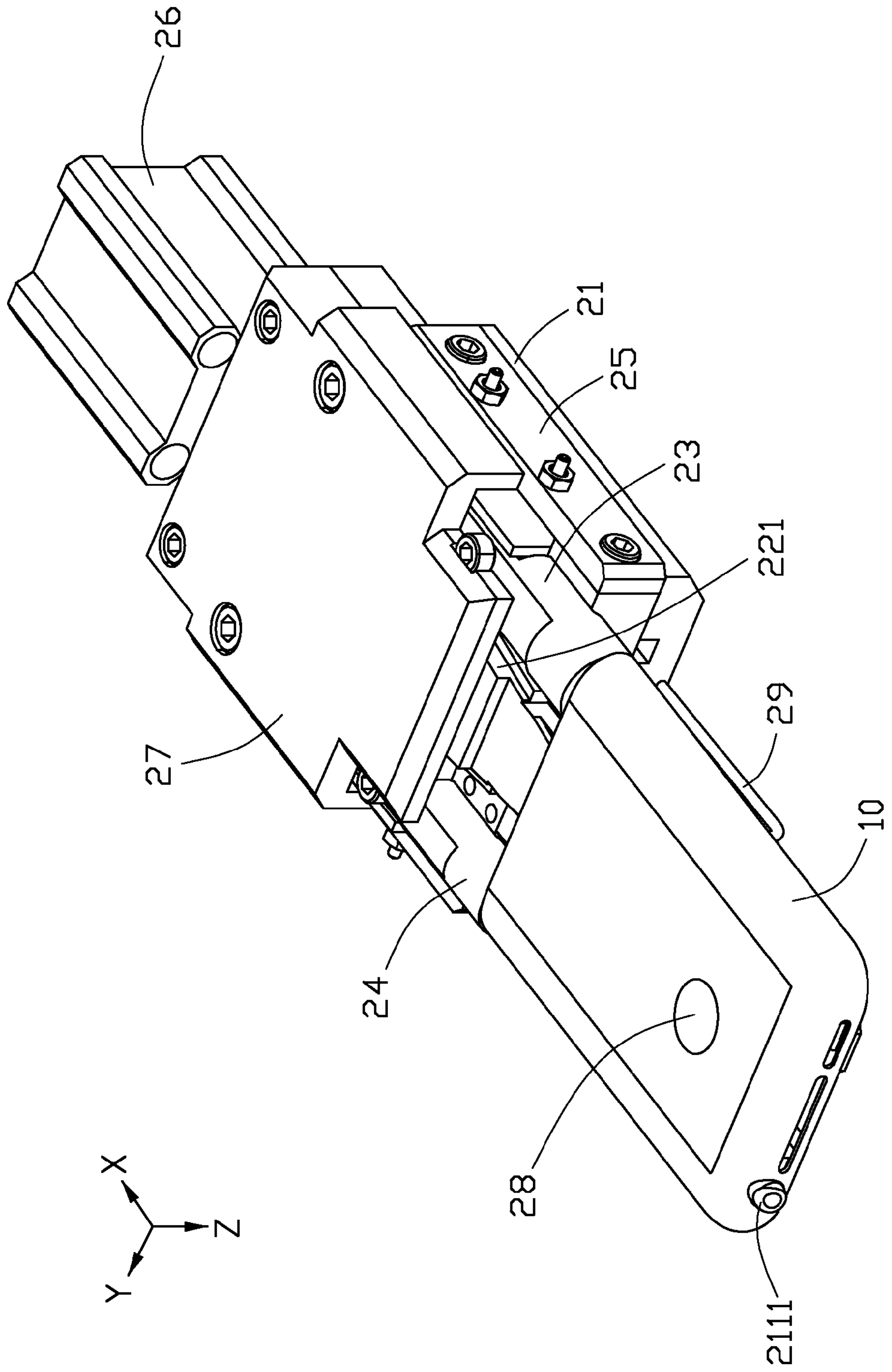
FIG. 5 is an isometric view showing the workpiece of FIG. 1 engaged by the clamp of FIG. 2.

Referring also to FIG. 5, in use, the workpiece 10 is placed on the first fixing arm 23 and the second fixing arm 24, and the protrusion 2111 of the first mating arm 211 engages in the second through hole 162 of the second sidewall 16. When the driving unit 26 moves the push block 221 along an X-direction, the slanted side surfaces 2211 of the push block 221 interact with the two connecting members 223, and the connecting members 223 are moved along a Y-direction until the connecting members 223 are restricted by the restricting members 25. The springs 2238 in the blind holes 2237 are compressed to accumulate elastic forces. The connecting members 223 move the first fixing arm 23 and the second fixing arm 24 to increase a distance between the first fixing arm 23 and the second fixing arm 24, and thus the workpiece 10 is fixed on the first fixing arm 23 and the second fixing arm 24. Simultaneously, the spring 2133 in the blind hole 2131 of the second mating arm 213 of the holder 21 moves the protecting member 28 towards the workpiece 10, such that the columnar protrusion 2811 of the first resisting portion 281 of the protecting member 28 is engaged in the first through hole 124 of the bottom board 12 of the workpiece 10. After the workpiece 10 is processed (i.e. the outer surface of the workpiece 10 is polished), the driving unit 26 stops resisting the push block 221, and the accumulative forces generated by the springs 2238 return the connecting members 223 close to each other, thereby decreasing the distance between the first fixing arm 23 and the second fixing arm 24. Therefore, the workpiece 10 is released by the first fixing arm 23 and the second fixing arm 24. Simultaneously, the connecting members 223 move the push block 221 backward, the slanted portion 2216 of the push block 221 moves the protecting member 28 towards the second mating arm 213 of the holder 21, and the columnar protrusion 2811 of the first resisting portion 281 exits from the first through hole 124 of the bottom board 12 of the workpiece 10. In this way, the workpiece 10 is released from the clamp 20.

The clamp 20 can automatically position and release the workpiece 10, thereby increasing the speed of the positioning process and reducing time consumption. In the clamp 20, the workpiece 10 is positioned, fixed, and released only by the driving unit 26; thus, the clamp 20 is relatively compact and reliable. Furthermore, the first fixing arm 23 and the second fixing arm 24 interact with the workpiece 10 only in the inner surface of the workpiece 10, such that the entire outer surface of the workpiece may be easily processed in a single step. In addition, the protrusion 2111 of the first mating arm 211 and the columnar protrusion 2811 of the protecting member 28 protect the first through hole 124 of the bottom board 12 and the second through hole 162 of the second sidewall 16 from deformation.

It is noted that the scope of the present clamp is not limited to the embodiments described above. For example, to ensure release of the workpiece 10 from the clamp 20, the clamp 20 can further incorporate a detector 29 configured on the holder 21, with a detecting head 291 of the detector 29 running through the clamping portion 235 of the first fixing arm 23. Furthermore, if the workpiece 10 does not have the first through hole 124 and second through hole 162, the first mating arm 211, the second mating arm 213, and the protecting member 28 can be omitted. If the driving unit 26 is configured to draw back the push block 221, the springs 2238 in the blind holes 2237 can be omitted. If the driving unit 26 is configured to control the movement of the push block 221, the restricting members 25 can be omitted. If dust generated during processing is minimal, the cover 27 can be omitted. In addition, the sliding protrusion 2215 of the push block 221 can be omitted. The push block 221 can instead be unsymmetrical.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A clamp comprising:

a holder;

a moving unit comprising a push block, a connecting member and a guiding member, wherein the guiding member is fixed on the holder, the connecting member connects the push block and the guiding member, the push block comprises a slanted side surface and is capable of being guided to move by the guiding member, and the slanted side surface of the push block is capable of interacting with the connecting member;

a fixing arm fixed to the connecting member; and a driving unit connected to the push block of the moving unit and configured to move the push block.

2. The clamp of claim 1, wherein the holder comprises a first mating arm, a shape of the first mating arm corresponding to an outline of a workpiece fixed in the clamp.

3. The clamp of claim 2, wherein the push block further comprises an upper surface, a lower surface and a sliding protrusion, the slanted side surface connecting with the upper surface and the lower surface, the sliding protrusion formed on the lower surface; the connecting member comprises a mating surface; and the guiding member comprises a top surface and a guiding groove defined in the top surface, the mating surface mating with the slanted side surface, and the sliding protrusion engaged in the guiding groove.

4. The clamp of claim 3, wherein the connecting member further comprises a connecting side surface connecting the mating surface, the connecting side surface defining a mating groove therein; and the guiding member further comprises an inner side surface connecting with the top surface, a guiding protrusion formed on the inner side surface, with the guiding protrusion engaged in the mating groove.

5. The clamp of claim 4, further comprising a protecting member, wherein the holder further comprises a second mating arm, the protecting member configured on the second mating arm and the push block.

6. The clamp of claim 5, wherein the second mating arm comprises a blind hole defined in an end thereof and a spring in the blind hole, the protecting member resisted by the spring.

7. The clamp of claim 6, wherein the push block further comprises a clamping groove defined in an end thereof, and the protecting member comprises a connecting portion, the connecting portion clamped in the clamping groove.

8. The clamp of claim 1, wherein the fixing arm comprises a clamping portion with a shape corresponding to an outline of a workpiece fixed in the clamp.

9. The clamp of claim 1, further comprising a restricting member fixed to the guiding member beside the connecting member.

10. The clamp of claim 9, wherein the connecting member comprises an outer surface and a blind hole defined in the outer surface, and a spring is in the blind hole and resisted by the restricting member.

11. The clamp of claim 9, wherein the restricting member comprises a restricting pin for restricting the connecting member.

12. The clamp of claim 1, further comprising a cover on the moving unit.

13. The clamp of claim 1, further comprising a detector fixed to the holder.

14. The clamp of claim 1, wherein the detector comprises a detecting head passing through the fixing arm.

15. The clamp of claim 1, wherein the driving unit is an air cylinder or a motor.

* * * * *